United States Patent
Yang et al.

(10) Patent No.: US 7,941,123 B2
(45) Date of Patent: May 10, 2011

(54) METHOD AND SYSTEM FOR DOWNLOADING DATA TO MOBILE TERMINALS AND FOR IMPLEMENTING DATA SHARING BETWEEN MOBILE TERMINALS

(75) Inventors: Pengliang Yang, Shenzhen (CN); Yuan Tian, Shenzhen (CN); Yongsheng Zhu, Shenzhen (CN); Hui Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 803 days.

(21) Appl. No.: 11/502,845

(22) Filed: Aug. 11, 2006

(65) Prior Publication Data

US 2007/0037563 A1 Feb. 15, 2007

(30) Foreign Application Priority Data

Aug. 12, 2005 (CN) .......................... 2005 1 0090318
Aug. 17, 2005 (CN) .......................... 2005 1 0090515
Oct. 28, 2005 (CN) .......................... 2005 1 0116763

(51) Int. Cl.
| | |
|---|---|
| H04L 12/58 | (2006.01) |
| H04B 5/00 | (2006.01) |
| G01R 31/08 | (2006.01) |
| H04L 12/28 | (2006.01) |
| H04J 3/06 | (2006.01) |
| G06F 15/16 | (2006.01) |
| H04M 1/66 | (2006.01) |

(52) U.S. Cl. .................... 455/412.1; 455/41.1; 455/411; 370/230; 370/400; 370/503; 709/206; 709/219; 709/250

(58) Field of Classification Search .................. 455/411, 455/41.1, 412.1, 412.2, 550.1; 370/230, 370/400, 503; 709/208–211
See application file for complete search history.

(56) References Cited

U.S. PATENT DOCUMENTS

2002/0059400 A1 * 5/2002 Ikami et al. .................... 709/219
(Continued)

FOREIGN PATENT DOCUMENTS

CN 1425990 6/2003
(Continued)

OTHER PUBLICATIONS

Bakker, A., "Tribler Design Note: The Overlay Swarm Extension, Version 1." Feb. 27, 2006. XP-002409095.
(Continued)

*Primary Examiner* — Nick Corsaro
*Assistant Examiner* — Manpreet S Matharu
(74) *Attorney, Agent, or Firm* — Finnegan, Henderson, Farabow, Garrett & Dunner L.L.P.

(57) ABSTRACT

The invention discloses a method and system for downloading data to mobile terminals, a mobile terminal that utilizes the method, and a method and a system for implementing data sharing between mobile terminals. The method for data downloading includes: dividing data to be downloaded into multiple data task segments by a master mobile terminal, and allocating the data task segments to one or more mobile terminals; downloading the data by the mobile terminals in accordance with the allocated data task segments; judging by the master mobile terminal whether there are any data task segments that have not been downloaded; and if yes, allocating the data task segments to at least one mobile terminal that has finished downloading data task segment; and if no, terminating the download procedure. The system for data downloading includes: a server, at least a master mobile terminal, and at least a slave mobile terminal.

14 Claims, 7 Drawing Sheets

U.S. PATENT DOCUMENTS

| | | | |
|---|---|---|---|
| 2003/0013444 A1* | 1/2003 | Watanabe et al. | 455/435 |
| 2004/0058652 A1* | 3/2004 | McGregor et al. | 455/67.13 |
| 2005/0059379 A1* | 3/2005 | Sovio et al. | 455/411 |

FOREIGN PATENT DOCUMENTS

| | | |
|---|---|---|
| CN | 1578222 | 2/2005 |
| CN | 1578222 A | 2/2005 |
| KR | 2005/0048719 A | 5/2005 |
| KR | 2005/0053389 | 6/2005 |
| WO | WO 2004/043008 A1 | 5/2004 |
| WO | WO 2004/066160 A1 | 8/2004 |

OTHER PUBLICATIONS

Nandan, A., et al., "Co-operative Downloading in Vehicular Ad-hoc Wireless Networks." 2005. *Proceedings of the Second Annual Conference on Wireless On-demand Network Systems and Services.*

Sherwood, Rob, et al., "Slurpie: A Cooperative Bulk Data Transfer Protocol." 2004. *IEEE*, 0-7803-8355-9/04.

First Chinese Office Action dated (mailed) Jul. 27, 2007, issued in related Chinese Application No. 200510090318.4 Huawei Technologies C., Ltd (4 pages).

Written Opinion of the International Searching Authority (translation) dated (mailed) Nov. 11, 2006, issued in related Application No. PCT/CN2006/001764, filed Jul. 19, 2006, Huawei Technologies C., Ltd (5 pages).

First Chinese Office Action dated (mailed) Apr. 27, 2007, issued in related Chinese Application No. 200510090515.6 Huawei Technologies C., Ltd (7 pages).

First Chinese Office Action dated (mailed) Feb. 5, 2010, issued in related Chinese Application No. 200680012313.2 Huawei Technologies C., Ltd (12 pages).

* cited by examiner

User A    User B

METHOD AND SYSTEM FOR DOWNLOADING DATA TO MOBILE TERMINALS AND FOR IMPLEMENTING DATA SHARING BETWEEN MOBILE TERMINALS

FIELD OF THE PRESENT INVENTION

The present invention relates to information communication technology field, and more particularly, to a method and a system for downloading data to mobile terminals and for implementing data sharing between mobile terminals.

BACKGROUND OF THE PRESENT INVENTION

With the development of mobile communication technology, mobile terminals can also be used for entertainment, such as viewing a movie and downloading large-size software, besides the basic communication function. Our entertainment space can be widened if a mobile terminal may be used for entertainment, for example, during a journey or in remote areas where mobile service coverage is available, due to the portability of the mobile terminal. The mobile terminal can be utilized not only to browse news and information through Internet, but also to view movies.

In the prior art, a mobile terminal can access the internet through GPRS (General Packet Radio Service) or by dialing up, and download movies in form of media streams so as to view the movies. However, with such a download technique, each mobile terminal can only download data separately. If a same movie is to be viewed with multiple mobile terminals, each of the mobile terminals has to download that movie respectively, resulting in repeated download and the waste of bandwidth. In addition, with the above download technique, the download speed is usually lower than the playback speed, resulting in poor movie viewing experience. Furthermore, since each mobile terminal has to download the movie, a large part of bandwidth will be occupied, and the occupation time of bandwidth resource will be increased, thereby the cost will be increased accordingly.

Streaming media is a new network transmission technique, which, in brief, refers to the transmission of multimedia files over network with streaming technique. The streaming technique is a network transmission technique, which, by compressing and loading continuous video and audio data onto the servers at the website, enables the users to view and listen while downloading, instead of waiting the entire compressed file to be downloaded to the mobile terminal.

With the development of the radio technology, the bandwidth of wireless data access is continuously increased, and the processing capacity of a mobile terminal is improved, and a wide variety of high-quality streaming media services become matured. Though the streaming media platform, a mobile terminal can play news, movies, or music in audio/video streams at a low code rate and low speed, and play streaming media in live broadcast services; the mobile terminal can download services and media files. In addition, media files may be copyright-protected with the DRM (Digital Right Management) technique.

In the prior art, the method for playing with a mobile terminal is that, the mobile terminal establishes a connection to the network first; then, the mobile terminal downloads the data streams of streaming media from network side while playing the data streams in real time. This method is mainly characterized by its real-time and heavy occupation of network bandwidth.

In practical applications, there is often the case that two users wish to view a same streaming media at the same time. With the method described above, each of the two users has to establish a connection to the network respectively, as shown in FIG. 1. Then, each of the two users has to establish an over-the-air channel and download the streaming media via the air interface of the over-the-air channel, and play the streaming media locally respectively.

In the above described method for playing streaming media with a mobile terminal:

Overload of the device at the network side may occur, if there are many users downloading and viewing streaming media at the same time.

Too many resources may be occupied. The waste of the resources will occur when two users download the same content, if the two users are not distant from each other and are in the same cell of a base station. Furthermore, two many data connections should not be established in one cell.

This method suppresses the users' enthusiasm to view streaming media to a certain degree, because the users have to not only buy the copyright but also pay the download expense.

SUMMARY OF THE PRESENT INVENTION

The present invention is to provide a method for downloading data to mobile terminals, a system for downloading data, and a mobile terminal that utilizes that method. The present invention also provides a method and a system for implementing data sharing between mobile terminals, which implements data sharing and transmission between mobile terminals.

The present invention provides a method for downloading data to mobile terminals, so that the mobile terminal can join a shared download within the local connections.

In one aspect of the present invention, the method for downloading data to mobile terminals may include:

dividing data to be downloaded into multiple data task segments by a master mobile terminal, and allocating the data task segments to one or more mobile terminals;

downloading the data by the mobile terminals in accordance with the allocated data task segments;

judging by the master mobile terminal whether there are any data task segments that have not been downloaded; and if yes, allocating the data task segments to at least one mobile terminal that has finished downloading data task segment; and if no, terminating the download procedure.

Preferably, the method may further comprise the step of sending a request to at least one mobile terminal from the master mobile terminal through a local network before the master mobile terminal allocates the data task segments to the individual mobile terminals.

Preferably, the method may further comprise the step of obtaining the size of the data to be downloaded and determining the size of a data task segment by the master mobile terminal according to the size of the data before dividing the data into multiple data task segments.

Alternatively, in the case that a mobile terminal does not download a data task segment within a predefined duration, the master mobile terminal will allocate this data task segment to one or more other mobile terminals.

Wherein, a mobile terminals, that has finished downloading of an allocated data task segment, obtains IDs of one or more other mobile terminals from the master mobile terminal, and sends the data of the downloaded task segment to the one or more other mobile terminals in accordance with the obtained IDs.

Preferably, the method may further include the steps of:

reporting a message from a mobile terminal, that has finished downloading of an allocated data task segment, to the master mobile terminal indicating the allocated task segment has been downloaded;

notifying one or more other mobile terminals of the message by the master mobile terminal;

obtaining the downloaded data task segment by the one or more other mobile terminals from that mobile terminal that has finished downloading of the allocated data task segment.

Preferably, the method may further include the steps of:

when the master mobile terminal has downloaded a data task segment, sending the downloaded data task segment to one or more other mobile terminals;

when a slave mobile terminal has downloaded a data task segment allocated by the master mobile terminal, sending the downloaded data task segment to the master mobile terminal; storing the data task segment by the master mobile terminal and sending this data task segment to one or more other mobile terminals.

The present invention also provides a system for data downloading, the system include a server, at least one master mobile terminal, and at least one slave mobile terminal; wherein:

the master mobile terminal is designed to control the slave mobile terminals to download data segments and send the data segments downloaded by the master mobile terminal and/or the at least one slave mobile terminal to one or more other mobile terminals;

the at least one slave mobile terminal is designed to download a data segment allocated by the master mobile terminal and send the downloaded data segment to the master mobile terminal;

the master mobile terminal is connected to the at least one of slave mobile terminal through a network;

the server is designed to store data to be downloaded; each of the mobile terminals is connected to the server via a communication network so as to download data.

Wherein the network may be a Blue Teeth local network, an infrared local network and/or an Ultra Wide Band local network.

The present invention also provides a mobile terminal, which is connected to one or more other mobile terminals through a network, including:

a control unit, designed to control the mobile terminals connected therewith to download data and implement sharing of the downloaded data;

a download unit, designed to obtain the size of data to be downloaded and execute download task in accordance with the task segments to be downloaded.

Preferably, the control unit may include:

a calculating unit, designed to calculate the task segments of data to be downloaded with the size of data to be downloaded;

an allocating unit, designed to allocate the calculated task segments to the mobile terminals according to a predefined rule and distribute a data segment downloaded by a mobile terminal to one or more other mobile terminals.

In another aspect of the present invention, the method for downloading data to mobile terminals may include the following steps of:

obtaining location information of a master mobile terminal in a download group as well as characteristic information of data being downloaded;

locating a mobile terminal that sent a data download request and verifying whether the data download request is met and the master mobile terminal is located in a download group within local connections; po the mobile terminal that sent the data download request joining the download group as a slave mobile terminal in order to download data.

Preferably, the method may further include:

sending downloaded data from a slave mobile terminal in the download group to the master mobile terminal after the download is completed; sending the data, which is downloaded by one or more other mobile terminals, by the master mobile terminal to the slave mobile terminal in the download group.

Wherein the step, that the mobile terminal that sent the data download request joining the download group, may include the steps of:

inviting the mobile terminal that sent the data download request to join the download group by the master mobile terminal in the download group;

the mobile terminal, that sent the data download request, authenticating the master mobile terminal, and, if the authentication is successful, joining the download group.

Preferably, the method may further includes:

determining whether the data download requirement of the mobile terminal is met in accordance with the information, including ID, type, and size of data to be downloaded, carried in the download request and the location information obtained in the locating step.

Preferably, the method may further include:

obtaining location information of the master mobile terminal in the download group, which is in a downloading state, with CELL ID or AGPS; and/or locating the mobile terminal that sent the data download request with CELL ID or AGPS.

The present invention also provides a mobile terminal, which may include:

a network data flow control module, designed to establish a connection with network side and download data from the network side, and send the downloaded data to a network data storage and control module;

a network data storage and control module, designed to buffer the data from the network data flow control module and send the buffered data to a local data flow control module according to a request message;

a local data flow control module, designed to send a request message to the network data storage and control module and send the data stored in the network data storage and control module to one or more other mobile terminals according to a predefined QoS.

The mobile terminal may further include:

a data sharing and communication management module, designed to receive a data connection request message from one or more other mobile terminals, perform authentication and encryption operations for one or more other mobile terminals, and send the authenticated result to the local data flow control module.

Optionally, the terminal may further include:

a local application data application module, designed to send a request to the network data storage and control module and receive data from the network data storage and control module.

The present invention also provides another mobile terminal, which includes:

a network data storage and control module, designed to receive and buffer data from a master mobile terminal and send the buffered data to a local application data application module and a local data flow control module according to a request message;

a local application data application module, designed to send a request message to the network data storage and control module and receive data from the network data storage and control module;

a local data flow control module, designed to send a request message to the network data storage and control module and send the data from the network data storage and control module to other slave mobile terminals according to a predefined QoS.

The mobile terminal may further include:

a data sharing and communication management module, designed to receive a data connection request message from other slave mobile terminals, perform authentication and encryption control operations for other slave mobile terminals, and send the authenticated result to the local data flow control module.

In another aspect of the present invention, the system for implementing data sharing between mobile terminals provided in the present invention may include:

a master mobile terminal, designed to establish a connection with network side and download data from the network side, establish a local data sharing network with slave mobile terminals in a wired or wireless manner, and send the downloaded data to the slave mobile terminals through the local data sharing network;

one or more slave mobile terminals, designed to establish a local data sharing network with the master mobile terminal in a wired or wireless manner, receive data from the master mobile terminal, and send the received data to other slave mobile terminals.

The network formed by the master mobile terminal and all the other mobile terminals are of a star shaped structure, a chain shaped structure, or a tree structure.

The present invention also provides another system for implementing data sharing between mobile terminals, which may include:

a master mobile terminal, designed to establish a connection with network side and download data from the network side, establish a local data sharing network with one or more slave master mobile terminals in a wired or wireless manner, and send the downloaded data to the one or more slave master mobile terminals through the local data sharing network;

one or more slave master mobile terminals, designed to receive streaming media data from the master mobile terminal and process the data accordingly, receive a data connection request from one or more other mobile terminals, perform access admission control operations, such as authentication, encryption, etc., for one or more other mobile terminals, and transmit the streaming media to one or more other mobile terminals according to a predefined QoS; in the case that an abnormity occurs in the master mobile terminal, the slave master mobile terminals receive shared data from one or more other mobile terminals and substitutes the master mobile terminal to implement the download function;

at least one mobile terminal device, designed to establish a local data sharing network with the master mobile terminal in a wired or wireless manner, receive data from the master mobile terminal through the local data sharing network, and send the received data to the slave master mobile terminals.

In the present invention, multiple mobile terminals are enabled to download data segments of a data respectively and share the downloaded data segments among them, thus the download time may be reduced and the download speed may be increased, for example, if there are N mobile terminals downloading data, the download time may be reduced to 1/N of the time required by a single mobile terminal, and the download speed may be increased u N times, which is adaptive to the playback speed of a movie, thereby improving the experience of the users.

By locating the mobile terminal that sent the data download request, and by verifying if the data download requirement of the mobile terminal is met and the master mobile terminal is located in the shared download group within local connections in accordance with the location information of the master mobile terminal in the shared download group and characteristic information of the data being downloaded, the mobile terminal that sent the data download request is enabled to join the shared download group as a slave mobile terminal and perform the shared data download. In the present invention, a mobile terminal can join an appropriate shared download group in the local network at any time, without the need of negotiating with other mobile terminals. Therefore, the difficulties in implementation of shared data download may be mitigated, and the applicability of shared data download may be improved.

It can be seen that, with the above technical scheme, network resources can be saved, the load over the equipment at network side may be reduced, and multiple mobile terminals may be enabled to play back the streaming media while a mobile terminal downloads the streaming media, thereby reducing the cost in downloading data by mobile terminals.

DETAILED DESCRIPTION OF THE EMBODIMENTS

The method for downloading data to mobile terminals and the supporting system thereof provided in an embodiment of the present invention utilize multiple mobile terminals to download the individual data segments of a data respectively, in which one mobile terminal (also referred to as the master mobile terminal) controls the download progress and sending the data downloaded by each mobile terminal to the other mobile terminals. Thereby, the download may be speeded up. The core idea of the method and the system for data sharing between mobile terminals according to an embodiment of the present invention is that, a mobile terminal establishes a connection to the network side to download streaming media, while other mobile terminals receive and play the streaming media through the local data sharing network.

Hereunder the embodiments of the present invention will be described with reference to the attached drawings.

Here we suppose that mobile terminals A, B, C, . . . , and N wish to obtain data "DATA" from the server. The mobile terminals A, B, C, . . . , and N download data through a communication network (e.g., a 3 G network, a GPRS network, etc.). The mobile terminals A, B, C, . . . , and N are connected through a high speed local network, which can be a local network constructed with Blue Tooth, infrared, or UWB technique. The transmission rate of the local network is required to be much higher than that of the communication network for over-the-air download. More generally, the transmission rate of the local network is at least higher than the product of the number of mobile terminals and the over-the-air download rate.

Due to the fact that a local network usually has a small radius of coverage (e.g., a radius of 10 m) but a high transmission rate (e.g., much higher than the transmission rate of a communication network), the mobile terminals described in the present invention should be within the coverage. In contrast, the system network has a lower transmission rate but a wider coverage.

In order to implement the embodiment of the present invention, one of the mobile terminals A, B, C, . . . , and N is designated as the master mobile terminal. This master mobile terminal only downloads data, but also allocates task segments for data downloading and distributes the download tasks to the other mobile terminals. The other mobile terminals are designated as slave mobile terminals, which are mainly responsible for data downloading.

Figure 1:
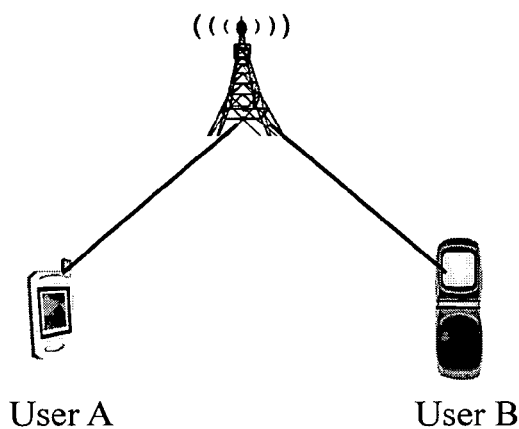
FIG. 1 is a schematic diagram illustrating two users connect to the network respectively in the prior art.
Figure 2:
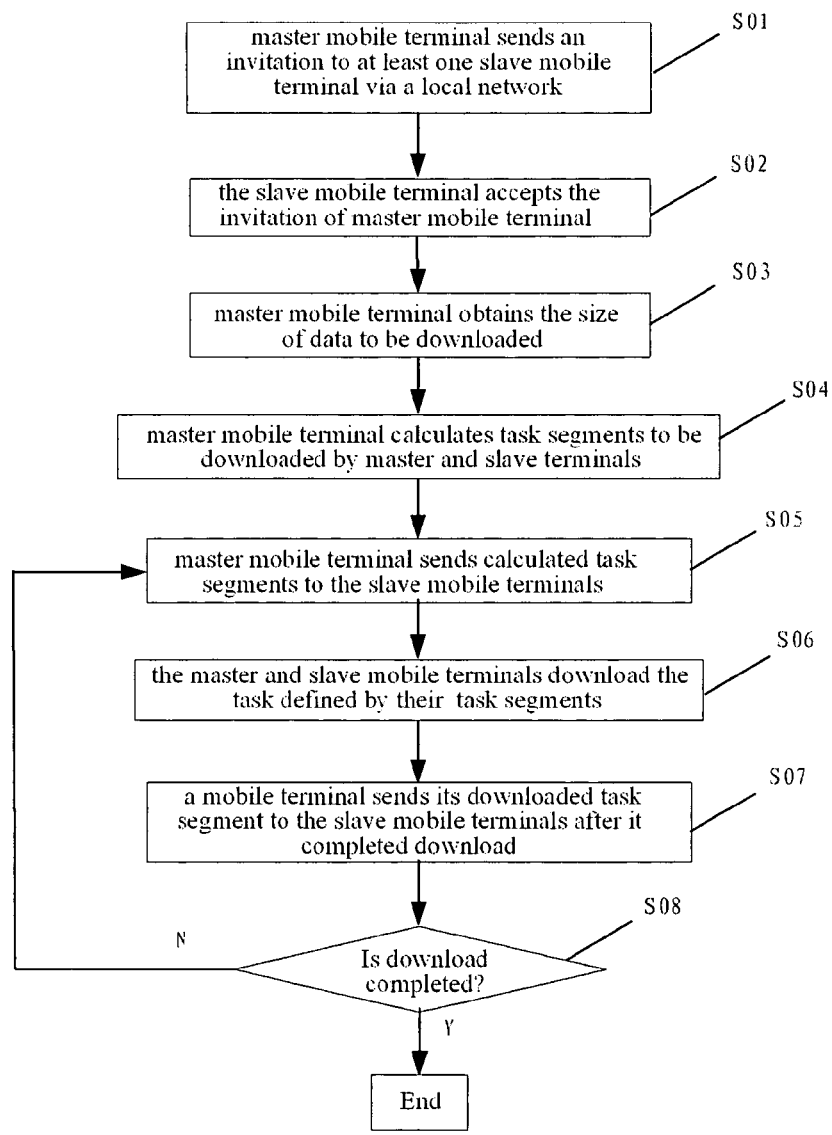
FIG. 2 is a flow diagram of a download method according to an embodiment of the present invention.

To simplify the description, here we suppose that the mobile terminal A is the master mobile terminal and the mobile terminals B, C, . . . , and N are slave mobile terminals, as shown in FIG. 2. Hereunder the process that the mobile terminals A, B, C, . . . , and N cooperate for data downloading will be described.

Step S01, The master mobile terminal A originates an invitation to the mobile terminals B, C, . . . , and N through the local network for data downloading.

Step S02, A part or all of slave mobile terminals B, C, . . . , and N accept the invitation from the master mobile terminal A. The master mobile terminal A records the IDs of the slave mobile terminals that have accepted the invitation. To simplify the description, hereunder we suppose all the slave mobile terminals accept the invitation from the master mobile terminal A.

Step S03, The master mobile terminal A obtains from the server the information about the size of DATA file to be downloaded.

Step S04, The master mobile terminal A calculates the task segments to be downloaded by the mobile terminals A, B, C, . . . , and N with a predefined algorithm.

The algorithm can be an average allocation algorithm, that is, the task for downloading DATA is divided into several (e.g., M, here it is supposed that N<<M) data task segments of equal size. The size of data task segment can be determined depending on the sizes of download buffers in the mobile terminals. For example, suppose the buffer size is SizeOfBuffer, the size of a data task segment can be SizeOfBuffer divided by N, or SizeOfBuffer divided by 2N, or SizeOfBuffer divided by 3 N, etc. After the data task has been divided into task segments, the master mobile terminal can allocate task segments 1, 2, 3, . . . , and N to the mobile terminals A, B, C, . . . , and N respectively. The mobile terminals A, B, C, . . . , and N may have different download rates. If the mobile terminal B finishes the download of an allocated task segment first, the master mobile terminal A will allocate task segment N+1 to the mobile terminal B; next, if the mobile terminal C finishes the download of an allocated task segment, master mobile terminal A will allocate task segment N+2 to the mobile terminal C, and so on, till the entire DATA is downloaded.

Step S05, The master mobile terminal A allocates task segments to be downloaded to the mobile terminals A, B, C, . . . , and N.

Step S06, The mobile terminals A, B, C, . . . , and N execute their download tasks in accordance with the task segments.

In order to ensure the normal download in the case that some mobile terminal fails in downloading, and to ensure normal application (e.g., movie playback) of the downloaded data when the mobile terminals A, B, C, . . . , and N execute their download tasks in accordance with the task segments, the embodiment of the present invention also provides a failure recovery mechanism. After the master mobile terminal allocates the above mentioned task segments to the individual mobile terminals the first time and the mobile terminals finish the allocated task segments, each of the mobile terminals is required to report its download capability parameter (i.e., download rate) to the master mobile terminal. The master mobile terminal records the download capability parameter, and calculates the expected download time per data task segment for each mobile terminal by dividing the size of data task segment by the download capability of the mobile terminal. In the case that a mobile terminal executes the download task for a time exceeding a certain duration (this duration is determined though multiplying the expected time by a coefficient (>1)), it is considered that this mobile terminal has failed. In that case, the master mobile terminal can reallocate the data task segment, which has been allocated to this mobile terminal, to another mobile terminal.

Step S07, After a mobile terminal has finished the download of the allocated task segments, the other mobile terminals is enabled to obtain the downloaded task segment data. In the embodiments of the present invention, there are three ways for the other mobile terminals to be enabled to obtain the downloaded task segment data. The first way, the mobile terminal sends the downloaded task segment data to the other slave mobile terminals. At this time, the mobile terminal has to obtain from the master mobile terminal A the IDs of all slave mobile terminals involved in download, and then send the task segment data depending on the mobile terminal IDs. The second way, the mobile terminal reports a task segment download completion message to the master mobile terminal, which in turn notifies the other slave mobile terminals of the message, so that the other slave mobile terminals can obtain the downloaded data from that mobile terminal. The third way, when the slave mobile terminals B, C, . . . , and N finish the task segments allocated by the master mobile terminal A, the downloaded task segment data will be sent to the master mobile terminal A. The master mobile terminal A stores the task segment data sent from the slave mobile terminals B, C, . . . , or N, and sends the data to the other slave mobile terminals. When its own task segments is completed, the master mobile terminal A stores the task segment data and sends the data to the slave mobile terminals B, C, . . . , and N.

Step S08, The master mobile terminal A judges whether the download of "DATA" is finished. If the download is finished, the master mobile terminal A terminates the download procedure. Otherwise, the master mobile terminal A executes step S05, i.e., the master mobile terminal A allocates task segments that have not been finished to the mobile terminals that have finished their task segments, and S05-S08 is repeated, till the download is completed.

Figure 3:
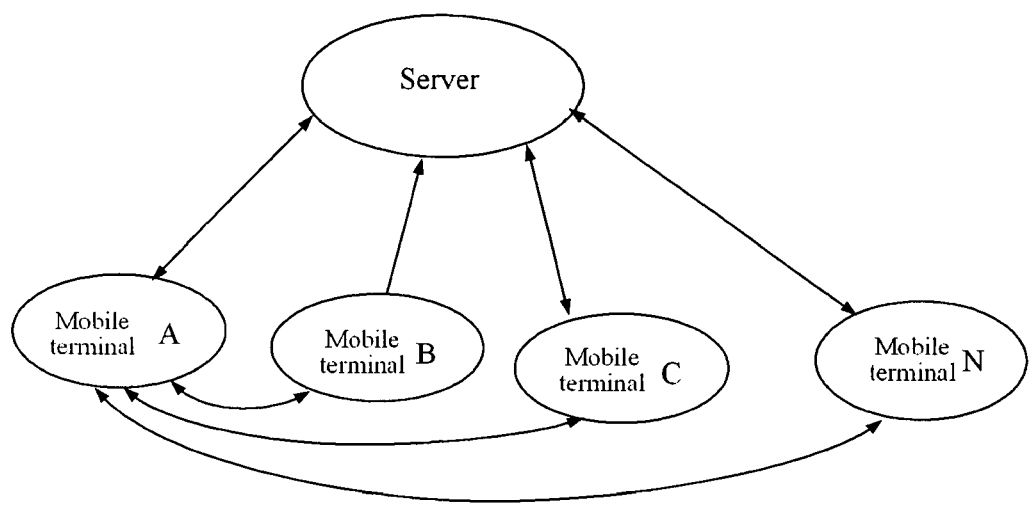
FIG. 3 is a flow diagram of a download system according to an embodiment of the present invention.

FIG. 3 shows a data download system provided in an embodiment if the present invention. The system includes a server that stores and manages the data to be downloaded and at least two mobile terminals.

At least one of the mobile terminals is the master mobile terminal, which is adapted to control other mobile terminal(s) to download a data segment, and send the downloaded data to mobile terminal(s). The slave mobile terminal(s) is (are) adapted to download data segments allocated by the master mobile terminal and send the downloaded data segments to the master mobile terminal. The mobile terminals are connected with each other through a local network and are connected to the server through a communication network (e.g., a 3 G network, a GPRS network, etc.), so as to download data from the server. The local network is a high-speed local wireless network, such as a local network constructed with Blue Teeth, infrared, or UWB (Ultra Wide Band) technique, with a transmission rate much higher than that of the over-the-air download communication network. In general, the transmission rate of the local network is at least higher than the product of the number of mobile terminals and the over-the-air download rate. Due to the fact that a local network usually has a small coverage radius (e.g., a radius of 10m) but a high transmission rate (e.g., much higher than the transmission rate of a communication network), the mobile terminals described in this embodiment of the present invention should be within the coverage. However, the system network has a lower transmission rate but a wider coverage.

Figure 4:
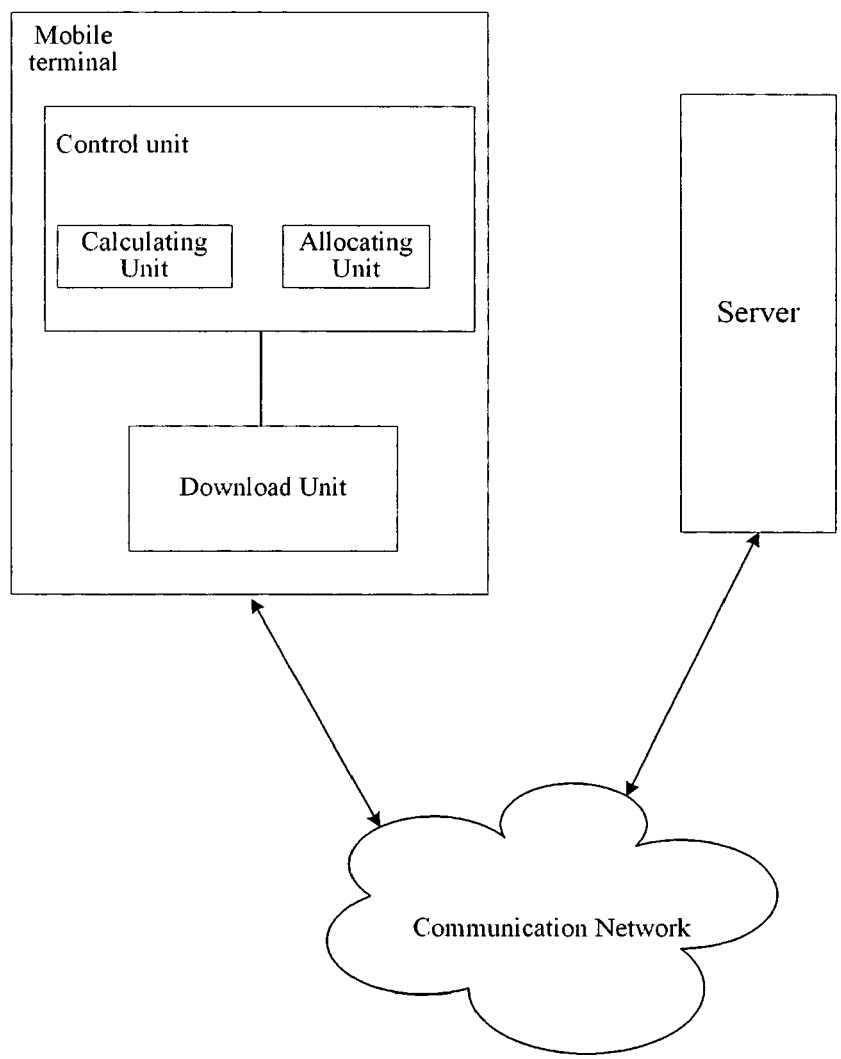
FIG. 4 is a schematic diagram of a mobile terminal according to an embodiment of the present invention.

As shown in FIG. 4, a mobile terminal, i.e., as the master mobile terminal, provided in the embodiment of the present invention may include:

a control unit, adapted to control the data download of the individual mobile terminals and implement the sharing of the downloaded data; a download unit, adapted to obtain the size of data to be downloaded and execute a download task in accordance with the download task segments.

The control unit may include: a calculating unit, adapted to calculate the individual task segments for downloading data depending upon the size of the data to be downloaded; a allocating unit, adapted to allocate the individual calculated task segments to the mobile terminals with a predefined algorithm, so that the mobile terminals can execute the download task depending upon the allocated task segments. The allocating unit is also adapted to send the data segments downloaded by a slave mobile terminal to the other slave mobile terminals.

The server is designed to store the data to be downloaded.

It is to be noted that the master mobile terminal must be a mobile terminal according to the embodiments of the present invention, and the slave mobile terminal can be mobile terminals according to the embodiments of the present invention or existing mobile terminals.

In the embodiments of the present invention, multiple mobile terminals are enabled to download data segments of a data respectively and share the downloaded data segments among them, thus the download time may be reduced and the download speed may be increased, for example, if there are N mobile terminals downloading data, the download time may be reduced to 1/N of the time required by a single mobile terminal, and the download speed may be increased u N times, which is adaptive to the playback speed of a movie, thereby meeting the requirement of the users. In addition, the method according to the embodiment of the present invention, compared with the method of downloading entire DATA by each mobile terminal respectively, can save the bandwidth occupied by downloading, since each of the N mobile terminals needs to download only a specific data segment.

A mobile terminal according to the embodiments of the present invention can join a shared download group that meets its data download requirement and has a master mobile terminal within its local connections, by obtaining the location information of the master mobile terminal in the shared download group and the characteristic information of the data being downloaded.

Hereunder, another method for downloading data to mobile terminals according to an embodiment of the present invention will described with reference to the attached drawings.

The mobile terminals in a shared download group download data from a server through a communication network (e.g., a 3 G network, a GPRS network, etc.). There is a master mobile terminal in the shared download group. The master mobile terminal not only downloads data, but also allocates download tasks and distributes the download tasks to the other mobile terminals. The other mobile terminals serve as slave mobile terminals and are mainly responsible for their download tasks. The mobile terminals in the shared download group are connected with each other through a local network, which is a high-speed local network constructed with Blue Teeth, infrared, or UWB (Ultra Wide Band) technique, with a transmission rate much higher than that of the communication network.

Figure 5:
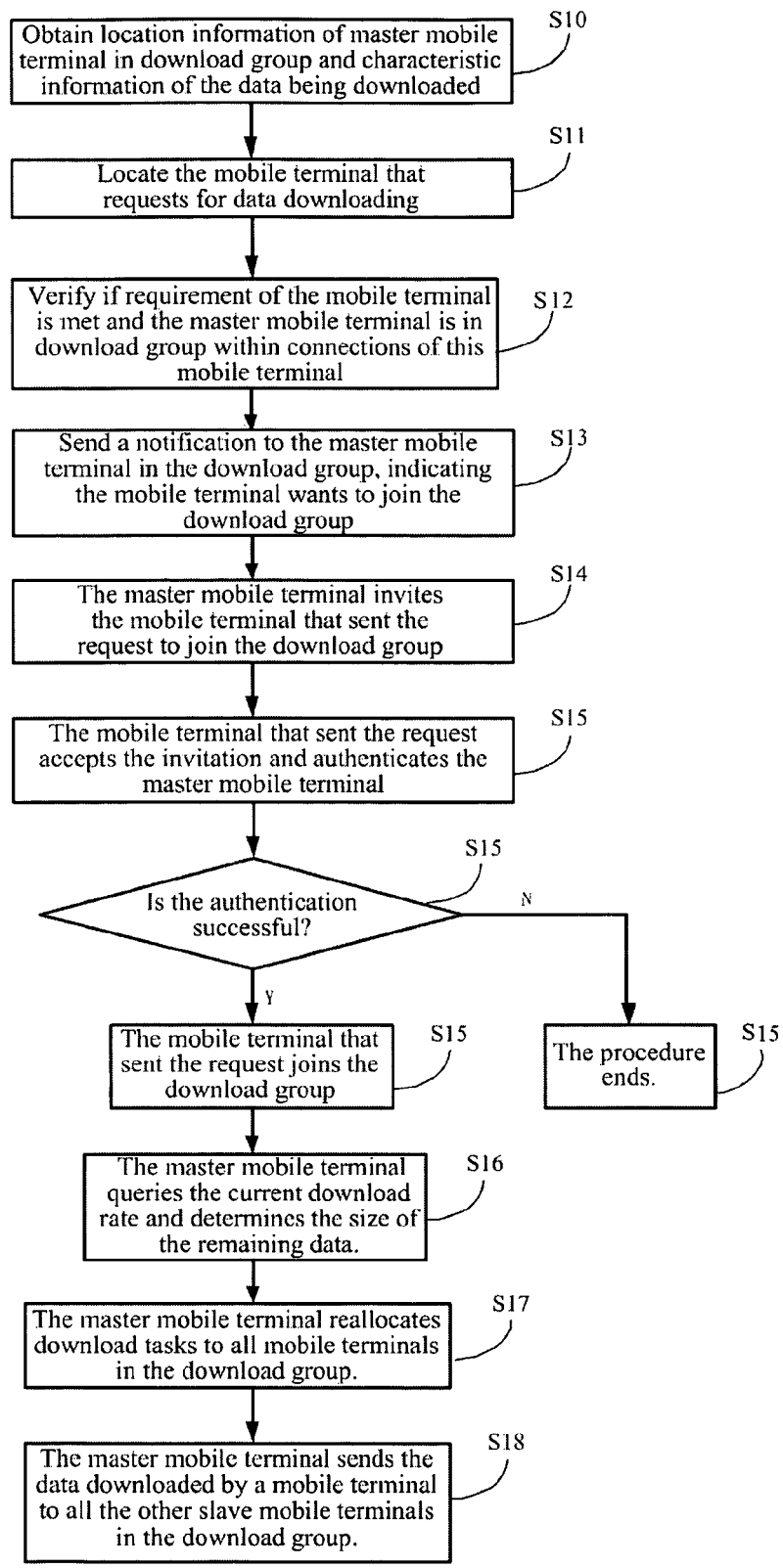
FIG. 5 is a flow diagram of the method for downloading data to mobile terminals according to another embodiment of the present invention.

FIG. 5 is a flow diagram of another method for downloading data to mobile terminals provided in an embodiment of the present invention; wherein the data download procedure is as follows:

Step S10, The server obtains and stores location information of the master mobile terminal in the shared download group in a shared download state as well as the characteristic information of the data being downloaded. The characteristic information includes file name, type, and size of the data being downloaded.

In this embodiment of the present invention, the server can utilize the CELL ID or AGPS (Assisted Global Positioning System) to obtain location information of the master mobile terminal, which will be described respectively below:

The principle of obtaining location information of the master mobile terminal by means of CELL ID is that: the server locates the master mobile terminal in accordance with the location of the current service base station and the coverage of the cell; if the cell is an omnidirectional one, the master mobile terminal locates in a circle with the service base station as its center and the coverage radius of the cell as its radius; and if the cell is a directional cell, the sector in which the master mobile terminal locates can be further ascertained.

The principle of obtaining location information of the master mobile terminal by means of AGPS is that: the master mobile terminal utilizes the AGPS information to capture the signals from the satellites and receive the measured information, and then sends the measured information to the positioning service center, which calculates the current location of the mobile terminal and sends the information to the server.

Step S11, Upon the reception of a data download request from a mobile terminal X, the server locates the mobile terminal X with CELL ID or AGPS.

Step S12, The shared download group that meets the data download requirement of the mobile terminal X and has a master mobile terminal in the effective range of the local connections of the mobile terminal X is determined in accordance with the information (i.e., file name, type, and size of the data to be downloaded) carried in this download request as well as the location information obtained through positioning. Herein we suppose, in the determined shared download group Y, the mobile terminal A is the master mobile terminal, and the mobile terminals B, C, . . . , and N are slave mobile terminals.

Step S13, The server sends a notification to the master mobile terminal A in the shared download group Y, to notify that the mobile terminal X wants to join the share download group.

Step S14, the master mobile terminal A invites the mobile terminal X to join the shared download group Y Step S15, the mobile terminal X accepts the invitation and authenticates the master mobile terminal A. If the authentication is successful, the mobile terminal X will join the shared download group Y and execute step S16; if the authentication fails, the mobile terminal X is unable to join the share download group, and thereby the procedure is terminated.

The mobile terminal X can authenticate the master mobile terminal A in a variety authenticating methods. For example, in step S11, the mobile terminal X generates a random number and sends the random number to the server when it sends a request for data download to the server. In step S13, the server sends a notification along with the random number to the master mobile terminal A. The master mobile terminal A sends that random number to the mobile terminal X when it invites the mobile terminal X to join the share download group. On receiving the random number, the mobile terminal X compares it with the random number stored locally; if the two random numbers are identical with each other, the mobile terminal X considers that the authentication of the master mobile terminal is successful; otherwise it will consider the authentication to be failed.

S16, the master mobile terminal A sends a query message to the slave mobile terminals in the group to query for the current download progress of each slave mobile terminal, and then determines the size of remaining data to be downloaded in accordance with the download condition of each slave mobile terminal.

Step S17, the master mobile terminal A reallocates download tasks to all mobile terminals in the shared download group, including the mobile terminal X, in accordance with the size of remaining data determined in step S16;

The master mobile terminal A can reallocate the download tasks with an average allocation algorithm, i.e., the download task is divided into several (e.g., M, here suppose N<<M) data task segments of equal size. The size of data task segment can be determined in accordance with the sizes of download buffers in the mobile terminals. For example, suppose the buffer size is S, the size of data task segment may be S divided by N, or S divided by 2 N, or S divided by 3N, etc. After the data task has been divided into task segments, the master mobile terminal can allocate the task segments 1, 2, 3, . . . , and N+1 to the mobile terminals A, B, C, . . . , N, and X respectively. The mobile terminals A, B, C, . . . , N, and X may have different download rates. If the mobile terminal B finishes the download of an allocated task segment first, the master mobile terminal A will allocate the task segment N+2 to the mobile terminal B; next, if the mobile terminal C finishes the download of an allocated task segment, the master mobile terminal A will allocate the task segment N+3 to the mobile terminal C, and so on, till the entire data is downloaded.

S18, after all mobile terminals in the shared download group finish their download tasks, the slave mobile terminals B, C, . . . , N, and X send the downloaded data to the master mobile terminal mobile terminal A. The master mobile terminal A sends the data downloaded by a mobile terminal to each of the other slave mobile terminals.

In the embodiments of the present invention, the mobile terminals ready for data downloading can join the appropriate shared download group in the local network at any time, without negotiating with the other mobile terminals. Thus, the difficulties in implementation of shared data download may be mitigated and applicability scenarios of shared data download may be broadened.

Figure 6:
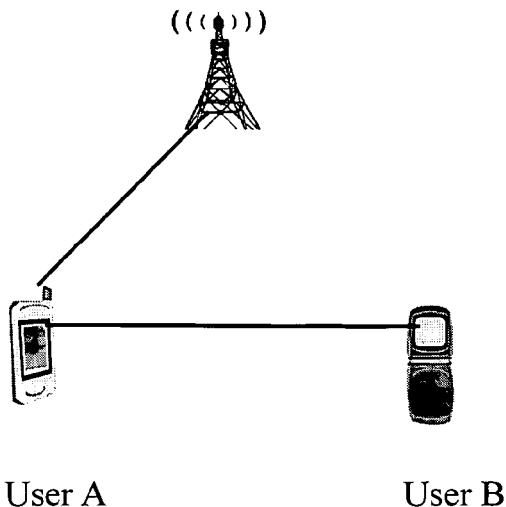
FIG. 6 shows the principle of a method for data sharing between mobile terminals according to an embodiment of the present invention.
Figure 7:
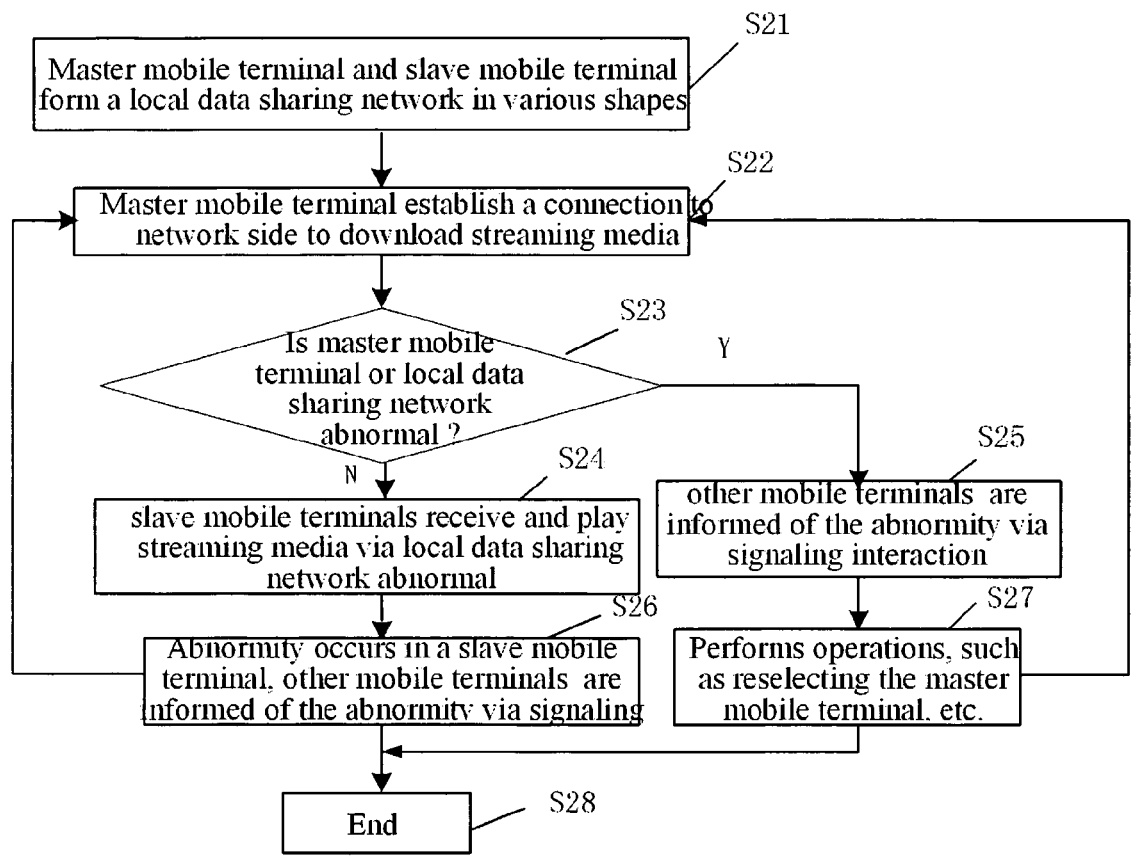
FIG. 7 is a processing flow chart of a method for data sharing between mobile terminals according to an embodiment of the present invention.

Hereunder, the method and the system for data sharing between mobile terminals provided in an embodiment of the present invention will be detailed with reference to the attached drawings. FIG. 6 shows the schematic diagram of the method for data sharing between mobile terminals provided in an embodiment of the present invention; FIG. 7 shows the processing flow of the method; wherein, the processing flow includes the following steps:

Step S21, a local data sharing network in established between the master mobile terminal and the slave mobile terminals and is networked in any shape.

In the embodiment of the present invention, a master mobile terminal that can download data from network side has to be chosen first. Then, a local data sharing network has to be established, between the master mobile terminal and other slave mobile terminals that require data sharing, through a variety of communication channels. The communication channels can include different kinds of wired and wireless connections, such as Blue Teeth, infrared, cable, or Wimax (Worldwide Interoperability for Microwave Access) connections. The mobile terminals can transmit data (e.g., streaming media) to each other through the local data sharing network.

The master mobile terminal and the slave mobile terminals can network in various shapes as required, such as serial structure (as shown in FIG. 4), star-shaped structure (as shown in FIG. 5), or tree structure, etc.

For example, in the network shown in FIG. 6, the user terminal A is a master mobile terminal, and a local data sharing network has to be established between the user terminal A and the user terminal B.

Step S22, the master mobile terminal establishes a connection to the network side and downloads streaming media.

After a local data sharing network is established between the master mobile terminal and the slave mobile terminals, the master mobile terminal establishes a connection to the network side through the communication system (e.g., WCDMA network, etc.) to download and play the data streams (e.g., streaming media, etc.).

For example, in the network shown in FIG. 6, the user terminal A is selected to establish a connection to the network side and download streaming media from the base station via an air interface. At this time, there are two networks including the user terminal A as a node, i.e., the WCDMA network between the user terminal A and the base station, and the data sharing network established between the user terminal A and the user terminal B.

Step S23, judge whether an abnormity occurs in the master mobile terminal or the local data sharing network.

In the embodiment of the present invention, after the connection between the master mobile terminal and the network side is established and the data stream (e.g., streaming media) are downloaded, it is required to judge whether an abnormity occurs in the master mobile terminal or the local data sharing network. The case of an abnormity, for example, may be that:

an abnormity occurs in the master mobile terminal during the download, such as failed download, degraded QoS, or the master mobile terminal stops downloading due to a certain cause;

an abnormity occurs in the local data sharing network due to a certain cause, such as local network connection is interrupted.

in case of any of the above abnormalities, step S25 is executed; otherwise step S24 is executed.

Step S24, the slave mobile terminals receive the streaming media through the local data sharing network and play the streaming media.

While the master mobile terminal connects to the base station and downloads the streaming media from the base station via the air interface, the other slave mobile terminals can negotiate with the master mobile terminal in a certain manner to receive the downloaded streaming media from the master mobile terminal through the local data sharing network and play the streaming media.

Any of the slave mobile terminals can also serve as a master party to transmit the received data to other slave mobile terminals, through the local data sharing network, according to the above mentioned star shaped structure, serial structure, or tree structure.

For example, in the network shown in FIG. 6, the user terminal A establishes a connection to the network side and downloads streaming media from the base station via an air interface. To view the same content, the user terminal B need not to establish any connection to the base station; instead, it can negotiate with the user terminal A and directly obtain the streaming media being downloaded by the user terminal A in a certain manner (through a Blue Teeth, Wimax, or cable connection, etc.), and play the streaming media locally. Certainly, if the streaming media requires a copyright file, the user terminal B has to download that copyright file separately.

The user terminal B can also serve as a master mobile terminal to transmit the received streaming media to other user terminals through the local data sharing network. Step S26 is then executed.

Step S25, the other slave mobile terminals are informed of the abnormality through message interaction.

In the case that an abnormity occurs in the master mobile terminal or the local data sharing network, the master mobile terminal informs the slave mobile terminals in the network of the abnormality through message interaction. Then, step S27 is executed.

Step S26, if an abnormity occurs in a slave mobile terminal, the slave mobile terminal informs the other mobile terminals of the abnormality through message interaction.

If an abnormity occurs in one or more slave mobile terminals during the transmission of the shared data, e.g., one or more slave mobile terminals exits the shared data receiving operation, the other mobile terminals will be affected to a certain degree. Therefore, the one or more slave mobile terminals inform the master mobile terminal and all of the other slave mobile terminals of the abnormality through message interaction, so that the master mobile terminal and the other slave mobile terminals can handle accordingly.

Then, the system can execute step S28 or return to step s22 as required.

Step S27, the operations, i.e., the reselection of the master mobile terminal, etc., are performed as required.

After an abnormity occurs in the master mobile terminal or the local sharing network, and the other mobile terminals are informed, necessary treatment can be performed as required. For example, a new master mobile terminal can be chosen, the streaming media can be downloaded and transmitted again, or the streaming media download and transmission can be paused, etc.

Then, the system can execute step S28 or return to step s22 as required.

Step S28, the procedure ends up.

Thus, the processing flow of the method according to the embodiments of the present invention is ended.

To implement the system described in the embodiments of the present invention, a master mobile terminal and a slave mobile terminal are disclosed.

Figure 10:
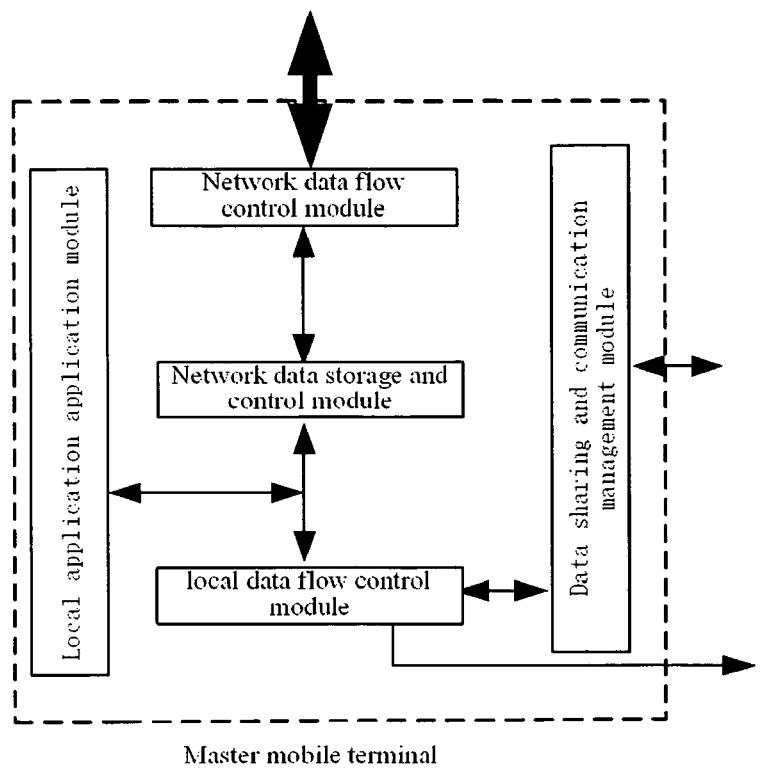
FIG. 10 is a structural diagram of a master mobile terminal according to an embodiment of the present invention.

FIG. 10 is a structure diagram of a master mobile terminal, which includes the following modules:

A network data flow control module, which is designed to establish a connection with the network side and download data (e.g., streaming media, etc.) from the network side, and send the downloaded data to a network data storage and control module;

A network data storage and control module, which is designed to receive and buffer the data (e.g., streaming media, etc.) sent from the network data flow control module and send the buffered data to a local application data application module and the local data flow control module based on a received request message;

A local application data application module, which is designed to send a request message to the network data storage and control module, receive data (e.g., streaming media, etc.) from the network data storage and control module, and operate other application programs on the master mobile terminal;

A data sharing and communication management module, which is designed to receive data connection request messages from one or more other mobile terminals, perform access admission control operations (e.g., authentication and encryption, etc.) to one or more other mobile terminals, and send the access admission control results to a local data flow control module;

A local data flow control module, which is designed to receive the access admission control results from the data sharing and communication management module, and transmit data (e.g., streaming media, etc.) to one or more other mobile terminals, that have passed the admission control, through the local data sharing network based on a predefined QoS; wherein the QoS is applied to ensure a correct and stable data transmission.

Figure 11:
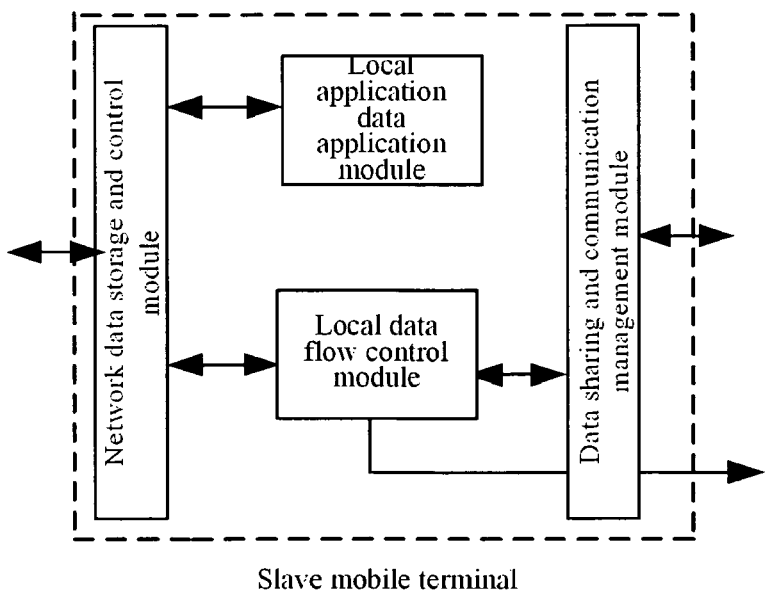
FIG. 11 is a structural diagram of a slave mobile terminal according to an embodiment of the present invention.

FIG. 11 is a structure diagram of a slave mobile terminal, which includes the following modules:

a network data storage and control module, which is designed to receive and buffer the data (e.g., streaming media, etc.) sent from the master mobile terminal and send the buffered data to a local application data application module and a local data flow control module based on a received request message;

a local application data application module, which is designed to send a request message to the network data storage and control module, receive data (e.g., streaming media, etc.) from the network data storage and control module, and operate other application programs on the slave mobile terminal;

a data sharing and communication management module, which is designed to receive data connection request messages sent from one or more other mobile terminals, perform access admission control operations (e.g., authentication and encryption, etc.) to one or more other mobile terminals, and send the access admission control results to a local data flow control module;

a local data flow control module, which is designed to receive the access admission control results from the data sharing and communication management module, and transmit data (e.g., streaming media, etc.) to one or more other mobile terminals, that have passed the admission control, through the local data sharing network based on a predefined QoS; wherein the QoS is applied to ensure a correct and stable data transmission.

Figure 12:
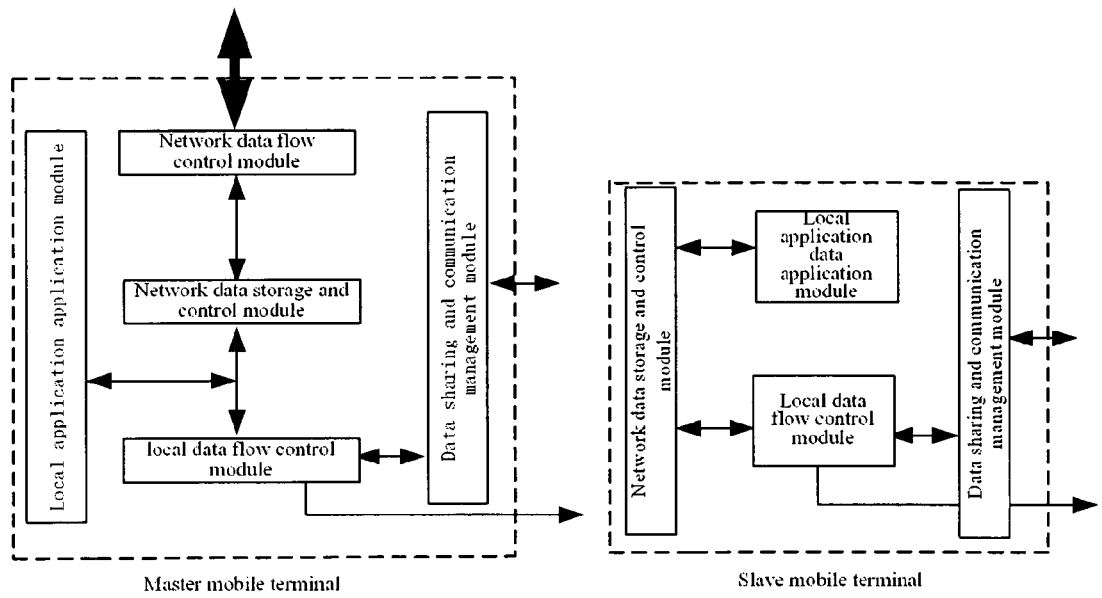
FIG. 12 is a structural diagram of a system according to an embodiment of the present invention.

With the above mentioned master mobile terminal and slave mobile terminal, an embodiment of the present invention provides a system for implementing data sharing between mobile terminals; as shown in FIG. 12, the system includes the following modules:

a master mobile terminal, which is designed to establish a connection with the network side and download data (e.g., streaming media, etc.) from the network side, establish a local data sharing network with slave mobile terminal(s) in a wired or wireless manner, and send the downloaded data (e.g., streaming media, etc.) to the slave mobile terminal(s) through the local data sharing network;

one or more slave mobile terminals, which are designed to establish a local data sharing network with the master mobile terminal in a wired or wireless manner, receive data (e.g., streaming media, etc.) from the master mobile terminal through the local data sharing network, and transmits the received data (e.g., streaming media, etc.) to the other slave mobile terminals as required.

Figure 8:
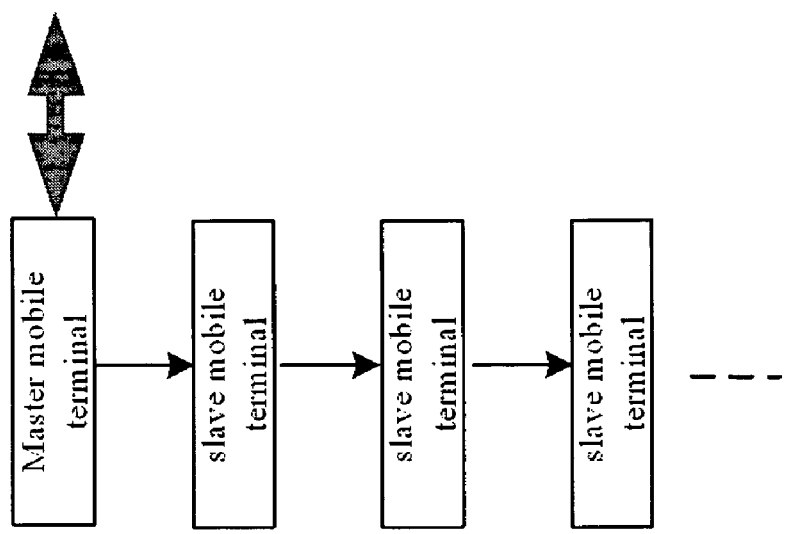
FIG. 8 is a schematic diagram of a serial structure formed by a master mobile terminal and slave mobile terminals.
Figure 9:
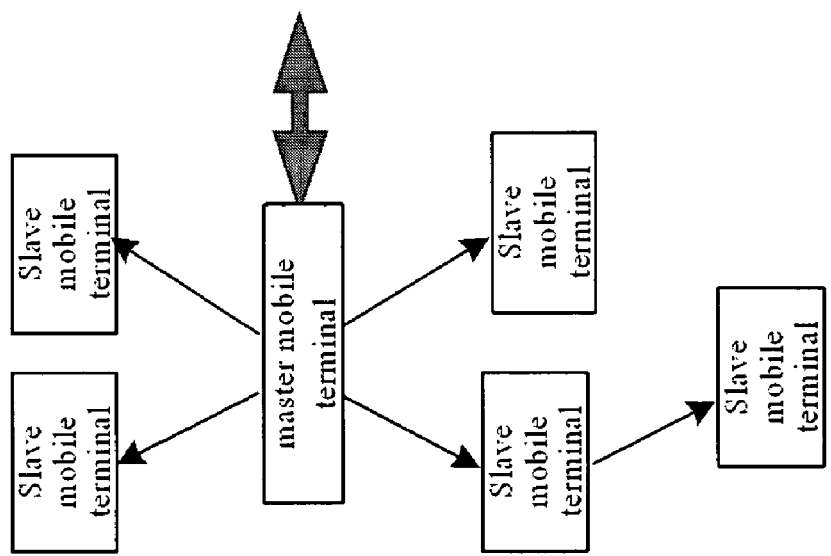
FIG. 9 is a schematic diagram of a star shaped structure formed by a master mobile terminal and slave mobile terminals.

The master mobile terminal and the slave mobile terminals can form a network in various shapes, such as serial structure (as shown in FIG. 8), star shaped structure (as shown in FIG. 9), or tree structure, etc.

Figure 13:
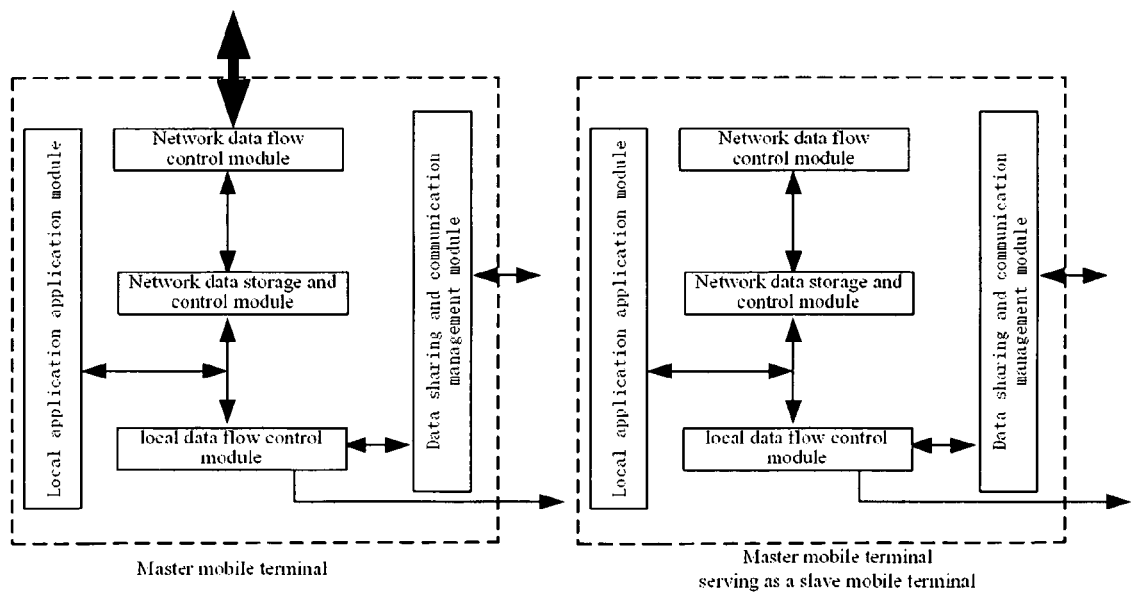
FIG. 13 is a structural diagram of a system according to another embodiment of the present invention.

An embodiment of the present invention also provides another system for data sharing between mobile terminals; as shown in FIG. 13, the system includes the following modules:

a master mobile terminal, which is designed to establish a connection with the network side and download data (e.g., streaming media, etc.) from the network side, establish a local data sharing network with slave master mobile terminal(s) in a wired or wireless manner; and the data (e.g., streaming media) downloaded through the local data sharing network may be sent to the master mobile terminal which serves as a slave mobile terminal; in the case that an abnormity occurs in the master mobile terminal, the master mobile terminal can serve as a slave mobile terminal and receive shared data from one or more other mobile terminals;

a slave master mobile terminals, which is designed to establish a local data sharing network with the master mobile terminal in a wired or wireless manner, receive data (e.g., streaming media, etc.) from the master mobile terminal through the local data sharing network, and transmit the received data (e.g., streaming media, etc.) to the master mobile terminal which serves as a slave mobile terminal.

In the case that an abnormity occurs in the master mobile terminal, the slave master mobile terminals can substitute the failed master mobile terminal to implement the download function, i.e., this slave master mobile terminal becomes the master mobile terminal, establishes a connection to the network side, downloads data (e.g., streaming media, etc.) from the network side, and then transmits the data to the other master mobile terminal, which serves as a slave mobile terminal, through the local data sharing network.

The above embodiments are provided only to describe and explain the principle of the present invention. It will be understood that the present invention are not limited to these embodiments. Those skilled in the art shall recognize that various changes in the form and the detail thereof shall be encompassed within the scope of the present invention, provided that these changes are not departing from the spirit and scope of the present invention. Therefore, the scope of the present invention shall be defined by the accompanied claims.

The invention claimed is:

1. A method for downloading data to mobile terminals, wherein a master mobile terminal is adapted to control one or more mobile terminal, the method comprising:
   obtaining information about size of data to be downloaded from a server by the master mobile terminal;
   calculating, by the master mobile terminal, task segments to be downloaded by the mobile terminals;
   dividing the data to be downloaded into multiple data task segments by the master mobile terminal, and allocating the data task segments to one or more mobile terminals;
   downloading the data by the mobile terminals in accordance with the allocated data task segments; and
   judging by the master mobile terminal whether there are any data task segments that have not been downloaded; and if yes, allocating the data task segments to at least one mobile terminal that has finished downloading data task segment; and if no, terminating the download procedure.

2. The method according to claim 1, further comprising the step of sending a request to at least one mobile terminal from the master mobile terminal through a local network before the master mobile terminal allocates the data task segments to the one or more mobile terminals.

3. The method according to claim 1, further comprising the step of obtaining information about the size of the data to be downloaded and determining the size of a data task segment by the master mobile terminal according to the size of the data before dividing the data into multiple data task segments.

4. The method according to claim 1, wherein in the case that a mobile terminal does not download a data task segment within a predefined duration, the master mobile terminal allocates this data task segment to one or more other mobile terminals.

5. The method according to claim 1, wherein a mobile terminal, that has finished downloading of an allocated data task segment, obtains IDs of one or more other mobile terminals from the master mobile terminal, and sends the data of the downloaded task segment to the one or more other mobile terminals in accordance with the obtained IDs.

6. The method according to claim 1, further comprising the steps of:
   reporting a message from a mobile terminal, that has finished downloading of an allocated data task segment, to the master mobile terminal indicating the allocated task segment has been downloaded;
   notifying one or more other mobile terminals of the message by the master mobile terminal;
   obtaining the downloaded data task segment by the one or more other mobile terminals from that mobile terminal that has finished downloading of the allocated data task segment.

7. The method according to claim 1, further comprising the steps of:
   when the master mobile terminal has downloaded a data task segment, sending the downloaded data task segment to one or more other mobile terminals;
   when a slave mobile terminal of the one or more mobile terminals has downloaded a data task segment allocated by the master mobile terminal, sending the downloaded data task segment to the master mobile terminal;
   storing the data task segment by the master mobile terminal and sending this data task segment to one or more other mobile terminals.

8. A system for data downloading, comprising a server, at least one master mobile terminal, and at least one slave mobile terminal; wherein:
the master mobile terminal is configured to control the at least one slave mobile terminal;
the master mobile terminal obtains information about size of data to be downloaded from the server;
the master mobile terminal calculates task segments to be downloaded by one or more of the master mobile terminal and the at least one slave mobile terminal;
the master mobile terminal is designed to divide the data to be downloaded into multiple data task segments, allocate the data task segments to one or more of the master mobile terminal and the at least one slave mobile terminal, and send the data segments downloaded by the one or more of the master mobile terminal and the at least one slave mobile terminal to one or more other mobile terminals;
the at least one slave mobile terminal is designed to download a data segment allocated by the master mobile terminal and send the downloaded data segment to the master mobile terminal;
the master mobile terminal is connected to the at least one of slave mobile terminal through a network;
the server is designed to store data to be downloaded; and
each of the mobile terminal is connected to the server via a communication network so as to download data.

9. The system according to claim 8, wherein the network is a Bluetooth local network, an infrared local network and/or an Ultra Wide Band local network.

10. The method according to claim 1, further comprising the following steps of:
obtaining location information of the master mobile terminal in a download group as well as characteristic information of data being downloaded;
locating a mobile terminal that sent a data download request and verifying whether the data download request is met and the master mobile terminal is located in the download group within local connections;
the mobile terminal that sent the data download request joining the download group as a slave mobile terminal in order to download data.

11. The method according to claim 10, further comprising:
sending downloaded data from a slave mobile terminal in the download group to the master mobile terminal after the download is completed;
sending the data, which is downloaded by one or more other mobile terminals, by the master mobile terminal to the slave mobile terminal in the download group.

12. The method according to claim 10, wherein the step, that the mobile terminal that sent the data download request joining the download group, comprising the steps of:
inviting the mobile terminal that sent the data download request to join the download group by the master mobile terminal in the download group;
the mobile terminal, that sent the data download request, authenticating the master mobile terminal, and, if the authentication is successful, joining the download group.

13. The method according to claim 10, further comprising:
determining whether the data download requirement of the mobile terminal is met in accordance with the information, including ID, type, and size of data to be downloaded, carried in the download request and the location information obtained in the locating step.

14. The method according to claim 10, further comprising:
obtaining location information of the master mobile terminal in the download group, which is in a downloading state, with CELL ID or AGPS; and/or
locating the mobile terminal that sent the data download request with CELL ID or AGPS.

* * * * *